(12) United States Patent
Liardet et al.

(10) Patent No.: US 8,848,917 B2
(45) Date of Patent: Sep. 30, 2014

(54) VERIFICATION OF THE INTEGRITY OF A CIPHERING KEY

(75) Inventors: Pierre-Yvan Liardet, Peynier (FR); Yannick Teglia, Marseilles (FR)

(73) Assignee: STMicroelectronics (Rousset) SAS, Rousset (FR)

( * ) Notice: Subject to any disclaimer, the term of this patent is extended or adjusted under 35 U.S.C. 154(b) by 1209 days.

(21) Appl. No.: 12/466,284

(22) Filed: May 14, 2009

(65) Prior Publication Data

US 2009/0285398 A1    Nov. 19, 2009

(30) Foreign Application Priority Data

May 16, 2008   (FR) ...................................... 08 53198

(51) Int. Cl.
*H04L 9/00*         (2006.01)
*H04L 9/32*         (2006.01)
*H04L 29/06*        (2006.01)
*H04L 9/08*         (2006.01)
*G06F 21/10*        (2013.01)
*G06F 17/30*        (2006.01)
*H04K 1/00*         (2006.01)

(52) U.S. Cl.
CPC ... *H04L 9/00* (2013.01); *H04L 9/32* (2013.01); *H04L 63/12* (2013.01); *H04L 9/08* (2013.01); *G06F 21/10* (2013.01); *G06F 17/30* (2013.01); *H04K 1/00* (2013.01)
USPC ............. 380/277; 380/255; 380/270; 380/29; 380/259; 380/44; 380/30; 380/268; 726/22; 726/26; 713/187; 713/164; 713/173

(58) Field of Classification Search
CPC ............. H04L 9/32; H06F 21/10; H04K 1/00
USPC ............................ 380/277, 255, 37; 370/389
See application file for complete search history.

(56) References Cited

U.S. PATENT DOCUMENTS 3,798,360 A  *  3/1974  Feistel ........................... 380/37
4,202,626 A  *  5/1980  Mayer et al. .................... 356/71

(Continued)

FOREIGN PATENT DOCUMENTS

FR            2 904 901 A       2/2008
WO      WO 2008079524 A2       7/2008

OTHER PUBLICATIONS

Jiao et al., "Error Masking Probability of 1's Complement Checksums".*
Barr, "Additive Checksums", 2007.*

(Continued)

*Primary Examiner* — Ondrej Vostal
(74) *Attorney, Agent, or Firm* — Wolf, Greenfield & Sacks, P.C.

(57) ABSTRACT

A method for verifying the integrity of a key implemented in a symmetrical ciphering or deciphering algorithm, including the steps of complementing to one at least the key; and verifying the coherence between two executions of the algorithm, respectively with the key and with the key complemented to one.

15 Claims, 3 Drawing Sheets

(56) References Cited

U.S. PATENT DOCUMENTS

| | | | |
|---|---|---|---|
| 4,879,747 A * | 11/1989 | Leighton et al. | 713/186 |
| 4,926,475 A | 5/1990 | Spiotta et al. | |
| 5,748,782 A * | 5/1998 | Ferreira et al. | 382/232 |
| 5,799,088 A * | 8/1998 | Raike | 380/30 |
| 5,910,989 A * | 6/1999 | Naccache | 713/173 |
| 6,289,023 B1 | 9/2001 | Dowling et al. | 370/419 |
| 6,728,930 B2 * | 4/2004 | Poeluev | 714/807 |
| 6,760,440 B1 * | 7/2004 | Driscoll | 380/37 |
| 6,996,712 B1 * | 2/2006 | Perlman et al. | 713/161 |
| 7,043,642 B1 * | 5/2006 | Lisimaque | 713/189 |
| 7,206,600 B2 * | 4/2007 | Reece et al. | 455/550.1 |
| 7,277,543 B1 * | 10/2007 | Driscoll | 380/43 |
| 7,403,620 B2 * | 7/2008 | Liardet et al. | 380/259 |
| 7,590,246 B2 * | 9/2009 | Calmels et al. | 380/270 |
| 7,822,207 B2 * | 10/2010 | Douguet et al. | 380/277 |
| 7,827,218 B1 * | 11/2010 | Mittal | 707/899 |
| 7,843,910 B2 * | 11/2010 | Loughran et al. | 370/389 |
| 7,987,366 B2 * | 7/2011 | Blom et al. | 713/171 |
| 8,019,989 B2 * | 9/2011 | Bosler | 713/156 |
| 8,024,560 B1 * | 9/2011 | Alten | 713/156 |
| 8,307,210 B1 * | 11/2012 | Duane | 713/172 |
| 8,453,238 B2 * | 5/2013 | Liardet et al. | 726/22 |
| 2001/0046292 A1 * | 11/2001 | Gligor et al. | 380/37 |
| 2002/0152386 A1 * | 10/2002 | De La Puente arrate et al. | 713/176 |
| 2003/0086571 A1 * | 5/2003 | Audebert et al. | 380/277 |
| 2003/0115345 A1 * | 6/2003 | Chien et al. | 709/229 |
| 2004/0030894 A1 * | 2/2004 | Labrou et al. | 713/168 |
| 2004/0039925 A1 * | 2/2004 | McMillan et al. | 713/189 |
| 2004/0073790 A1 * | 4/2004 | Ateniese et al. | 713/165 |
| 2004/0157584 A1 * | 8/2004 | Bensimon et al. | 455/411 |
| 2004/0179690 A1 * | 9/2004 | Soliman | 380/277 |
| 2005/0021955 A1 * | 1/2005 | Euchner et al. | 713/168 |
| 2005/0097348 A1 * | 5/2005 | Jakubowski et al. | 713/200 |
| 2005/0135606 A1 | 6/2005 | Brown | |
| 2005/0175175 A1 * | 8/2005 | Leech | 380/29 |
| 2005/0188219 A1 * | 8/2005 | Annic et al. | 713/200 |
| 2006/0227811 A1 * | 10/2006 | Hussain et al. | 370/503 |
| 2006/0230274 A1 * | 10/2006 | Surendran et al. | 713/176 |
| 2007/0074091 A1 * | 3/2007 | Go et al. | 714/752 |
| 2007/0116269 A1 * | 5/2007 | Nochta | 380/30 |
| 2007/0118274 A1 * | 5/2007 | Orebaugh | 701/117 |
| 2008/0152144 A1 * | 6/2008 | Douguet et al. | 380/277 |
| 2009/0010423 A1 * | 1/2009 | Sibert | 380/28 |
| 2011/0058670 A1 * | 3/2011 | Ala-Laurila et al. | 380/247 |
| 2011/0103584 A1 * | 5/2011 | Liardet et al. | 380/255 |

OTHER PUBLICATIONS

Stallings, "The TCP/IP Checksum", 2003.*
Kosky et al., "Exploring engineering: an introduction to engineering and design", p. 172.*
Bot, "oneC_sum()—One Complement's Checksum", 1995.*
Touch et al., "Implementing the Internet Checksum in Hardware", RFC 1936, 1996.*
Mogul et al., "Instance Digests in HTTP", RFC 3230, 2002.*
Postel, "User Datagram Protocol", RFC 768, 1980.*
Cisco, "TCP/IP Checksum", 1995-2011.*
Stone et al, "Performance of Checksums and CRC's over Real Data", 1998.*
Schneier, "Applied Cryptography", 1996.*
Kim et al., "A 2.3 Gb/s Fully Integrated and Synthesizable AES Rijndael Core", 2003.*
Information Sciences Institute, "Transmission Control Protocol Darpa Internet Program Protocol Specification", RFC 793, Sep. 1981.*
Information Sciences Institute, "Transmission Control Protocol Darpa Internet Program Protocol Specification", RFC 791, Sep. 1981.*
Braden et al., "Computing the Internet Checksum", 1988.*
Madhavapeddy et al., "Melange: Creating a 'Functional' Internet", 2007.*
Schneier, "Applied Cryptography second edition", 1996.*
Berent, "AES (Advanced Encryption Standard) Simplified".*
Deursen et al., "Attacks on RFID Protocols", 2009.*
Leon-Garcia et al., "Chapter 3 Digital Transmission Fundamentals", 2003.*
Lu, "Designing TCP/IP Functions in FPGAs", 2003.*
Manikandan et al., "Asynchronous Design Methodology for an Efficient Implementation of Low Power ALU", 2006.*
Oppenheim et al., "Effects of Finite Register Length in Digital Filtering and the Fast Fourier Transform", 1972.*
Egevang et al., "The IP Network Address Translator (NAT)", 1994.*
Menezes et al., "Handbook of Applied Cryptography", chapter 1, 1996.*
Berent, "AES (Advanced Encryption Standard) Simplified", 2003.*
Menezes, Vanstone, Oorschot, "Handbook of Applied Cryptography." 1997, CRC Press LLC, USA, pp. 15-16, 21, 250-254, 580.
French Search Report dated Oct. 8, 2008 from French Patent Application No. 08/53198.

* cited by examiner

VERIFICATION OF THE INTEGRITY OF A CIPHERING KEY

CROSS REFERENCE TO RELATED APPLICATIONS

This application claims the priority benefit of French patent application number 08/53198, filed on May 16, 2008, entitled "VERIFICATION OF THE INTEGRITY OF A CIPHERING KEY," which is hereby incorporated by reference to the maximum extent allowable by law.

BACKGROUND OF THE INVENTION

1. Field of the Invention

The present invention generally relates to electronic circuits and, more specifically, to data processing units implementing ciphering or deciphering algorithms. The present invention more specifically relates to mechanisms for verifying the integrity of a key manipulated by such algorithms.

2. Discussion of the Related Art

When a processing unit (typically a cryptoprocessor) is used to implement a ciphering algorithm, it should be verified that the manipulated key has not been modified (incidentally or intentionally), either during transfer to the cryptoprocessor from an external circuit, or after transfer while it is stored in a specific register of the cryptoprocessor.

To avoid a modification during the transfer, a solution is to recharge the key in the cryptoprocessor as often as possible, generally on each new ciphering, or periodically.

To check the integrity of the key once it is in the cryptoprocessor, the simplest would be to read this key to control it outside of the cryptoprocessor. However, to protect the key against possible hacking attempts, the temporary storage element (register) which contains the key is only accessible from outside of the cryptoprocessor in write mode. The integrity verification then comprises verifying the coherence of results obtained by two separate calculations using the key contained in the cryptoprocessor. The two calculations are either two cipherings of a same message with the key, or a ciphering followed by a deciphering.

However, if one of the bits of the key is modified in the key register and this register is not modified between the two calculations (be they successive or in parallel) or if it undergoes the same modification during both loadings, the verification mechanism is incapable of noticing it.

SUMMARY OF THE INVENTION

It would be desirable to have a mechanism for verifying the integrity of a key manipulated by a ciphering key, which overcomes all or part of the disadvantages of usual integrity verification mechanisms.

It would also be desirable to detect a modification of the key in the internal register of the cryptoprocessor, even if this register is not accessible in read mode from the outside.

It would also be desirable to detect an inversion of one or several bits of the key in a verification mechanism implementing two executions of the calculation (double ciphering, double deciphering, ciphering followed by a deciphering or the opposite).

To achieve all or part of these objects as well as others, at least one embodiment of the present invention provides a method for verifying the integrity of a key implemented in a symmetrical ciphering or deciphering algorithm, comprising the steps of:

complementing to one (also known as "ones complementing") at least the key; and verifying the coherence between two w executions of the algorithm, respectively with the key and ith the key complemented to one.

According to an embodiment, the result of a first execution of the algorithm with a data value and the key, or the complement to one of this result, is compared with the complement to one of the result of a second execution of the algorithm with the data value complemented to one and the key complemented to one, respectively with the result of this second execution.

According to an embodiment, a first execution of an algorithm of ciphering or deciphering of a data value with the key is followed by an execution of a corresponding deciphering or ciphering algorithm with the complemented result of the first execution and the complemented key.

According to an embodiment, the result of the second execution or its complement to one is compared with the complement to one of the data value or with the data value.

According to an embodiment, the verification compares two successive executions.

According to an embodiment, the verification compares two parallel executions.

According to an embodiment, the used algorithm is the DES or one of its variations.

At least one embodiment of the present invention also provides an electronic circuit capable of implementing the verification method.

At least one embodiment of the present invention also provides a system comprising an electronic ciphering or deciphering circuit and an electronic circuit for processing ciphered data or deciphered data.

The foregoing objects, features, and advantages of the present invention will be discussed in detail in the following non-limiting description of specific embodiments in connection with the accompanying drawings.

DETAILED DESCRIPTION

Figure 1:
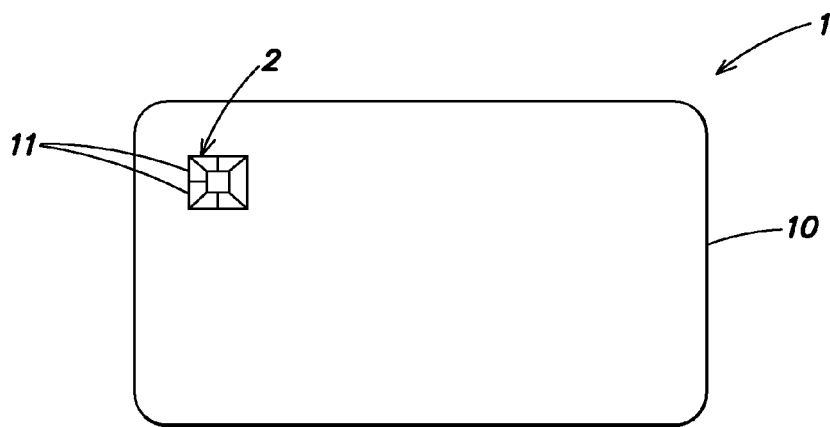
FIG. 1 is a simplified view of an integrated circuit card of the type to which the present invention applies as an example.

The same elements have been designated with the same reference numerals in the different drawings. For clarity, only those steps and elements which are useful to the understanding of the present invention have been shown and will be described. In particular, the use of the data to be ciphered or of the ciphered data has not been detailed, the present invention being compatible with any common use. Further, the elements of the cryptographic processing unit or of the other circuits have not been detailed, the present invention being here again compatible with usual structures. Reference will be made hereafter to the word "ciphering" to designate, unless otherwise specified, a ciphering and/or a deciphering, which are similar mechanisms (application of an algorithm to data and one or several keys).

FIG. 1 is a simplified representation of an integrated circuit card 1 to which the embodiments which will be described can apply. Such a card 1 is formed of a support 10, for example, made of plastic, which supports or comprises one or several integrated circuits 2. Circuit(s) 2 are capable of communicating with the outside of the card (for example, with a read or read-write terminal) by means of contacts 11 or by contactless transmit-receive elements (not shown), as an electromagnetic transponder. Circuit(s) 2 comprise at least one ciphering unit (generally called a cryptoprocessor) capable of executing ciphering and/or deciphering calculations based on one or several keys loaded in the processing unit.

The use of ciphering algorithms finds many applications in the electronics industry for integrated circuit card systems, toll television systems, ciphered communication systems, etc. In all cases, an algorithmic processing unit capable of implementing ciphering and/or deciphering mechanisms can be found.

Figure 2:
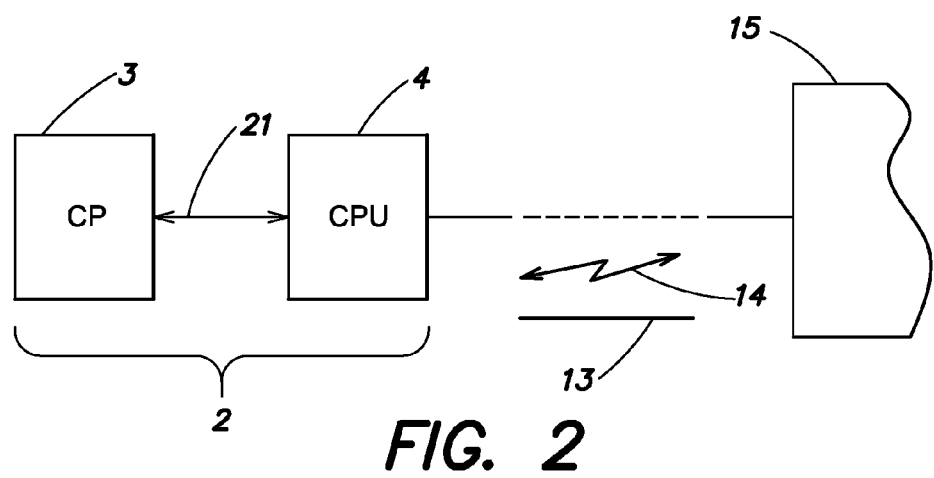
FIG. 2 is a block diagram of a system using a ciphering/deciphering unit of cryptoprocessor type.

FIG. 2 is a block diagram of a system using a cryptoprocessor 3 (CP). This cryptoprocessor is an integrated circuit considered as tamper-proof and which implements one or several ciphering or deciphering algorithms applied to data that it receives from the outside, by using one or several keys that it contains or that it receives from the outside. Cryptoprocessor 3 is, for example, capable of communicating with a processing unit 4 (for example, a central processing unit CPU) of a circuit 2 integrating the two elements 3 and 4 (and generally other circuits, not shown, such as volatile and non-volatile memories, an input-output interface, etc.). Circuit 2 is capable of communicating over a wire connection 13 or over a wireless connection 14 with a separate device 15, for example, a circuit for processing ciphered or deciphered data.

Figure 3:
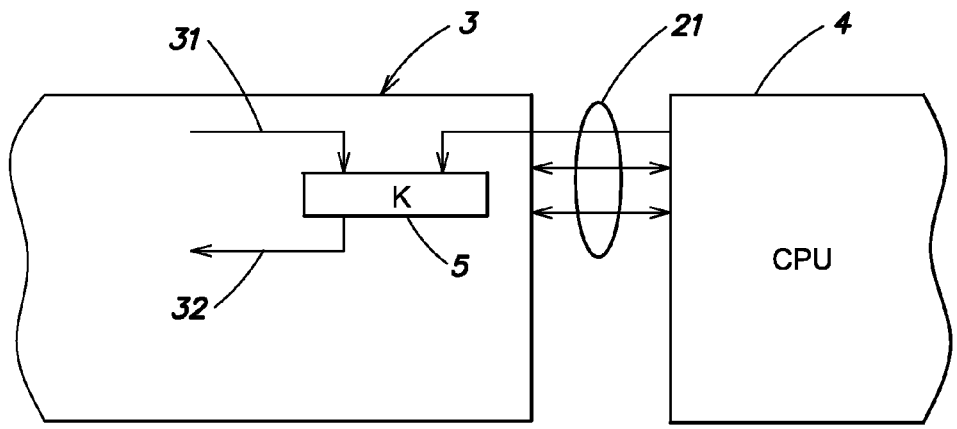
FIG. 3 is a partial block diagram of a circuit integrating a ciphering/deciphering unit and a central processing unit.

FIG. 3 is a detail of the diagram of FIG. 2 showing, in circuit 3, a temporary internal storage element 5 (typically, a register). Of course, unit 3 generally comprises several registers for temporarily storing the ciphered data, the data to be ciphered, and other variables, as well as other elements enabling it to execute the ciphering algorithm (wired logic, memories, software instruction processing unit, etc.). A specific register which is intended to contain ciphering K is here considered. Register 5 will then be designated as a key register. Unit 3 may contain several key registers. A specificity of key registers is that they are only capable of being read by unit 3 (connection 32) and not from the outside. The loading of the key(s) may be performed from the outside (connection 21), for example, by central unit 4 of circuit 2 or from the inside (connection 31) of cryptoprocessor 3 (for example, in case of previous processings on the key or if the key is contained in a storage element of circuit 3). An attempt to access to register 5 in read mode by unit 4 results, for example, in a locking of the system, in an access denial, in an erroneous reading (which does not give the value contained in register 5), etc. The content of register 5 is read by cryptoprocessor 3 each time it needs the key for a ciphering or deciphering operation.

Figures 4A, 4B:
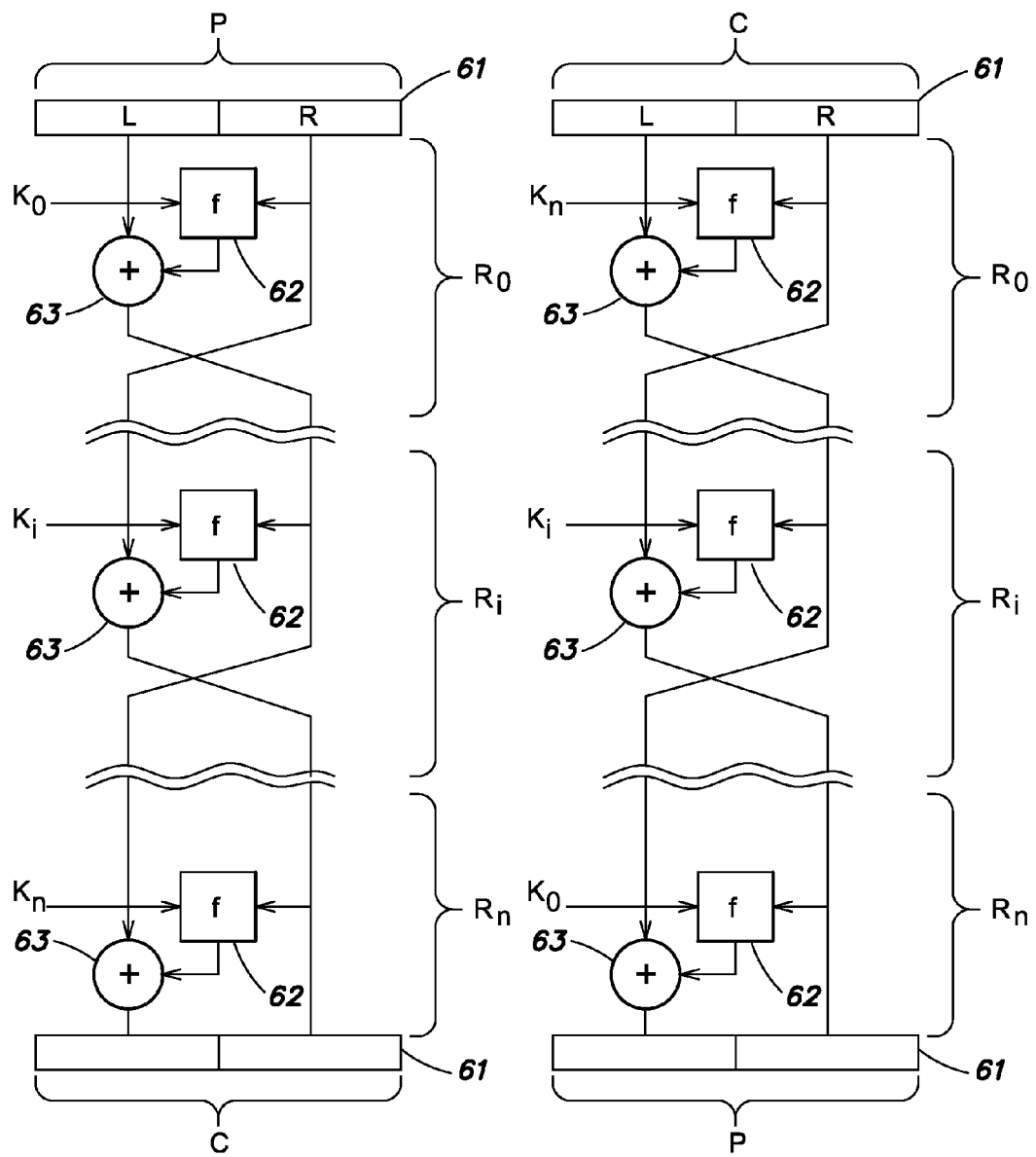
FIGS. 4A and 4B are block diagrams illustrating an example of a ciphering and deciphering algorithm to which an integrity verification is to be applied.

FIGS. 4A and 4B are block diagrams respectively illustrating the architecture of ciphering and deciphering algorithms to which the integrity verification applies.

The considered algorithms are so-called Feistel algorithms. Such algorithms perform a symmetrical ciphering, by blocks, and are characterized by ciphering and deciphering operations which are similar, or even identical, and only require an inversion of the order of use of keys (or sub-keys) extracted from the key contained in the key register. Most often, Feistel networks or diagrams combine several rounds of identical operations including a diffusion function (for example, a permutation of the bits), a non-linear function (for example, of substitution) generating a confusion effect, and a linear mixing using a bit-to-bit combination (XOR). Among Feistel algorithms, those in which the result of the ciphering of a message by a key is equal to the complement to one of the result of the ciphering of the complement to one of the message by the complement to one of the key will be selected.

An example of a Feistel algorithm which has this property is the DES algorithm and its different variations. Other examples are the algorithms known as LOKI and GHOST.

The ciphering algorithm (FIG. 4A) comprises submitting a message P to be ciphered (plain text) to successive operations. Message P is separated in two parts of identical size (arbitrarily designated as the right-hand portion R and left-hand portion L). This message is contained in a register 61 of circuit 3 (or in two registers respectively assigned to the right-hand and left-hand portions). The algorithm is executed in n+1 rounds $R_i$, with i ranging between 0 and n>1). In each round, right-hand portion R of register 61 is submitted (block 62) to a non-linear function f with a sub-key $K_i$ (with i ranging between 0 and n). This sub-key is obtained from a general ciphering key (typically, key K contained in register 5—FIG. 3). The result of the ciphering function is mixed (bit-to-bit addition 63) with left-hand portion L of the register, which corresponds to the result of the previous round (of message P for first round $R_0$). Finally, right-hand portion R and left-hand portion L are permuted for the next round. At the end of the n-th round, ciphering message C is obtained. The last round $R_n$ generally comprises no permutation of the right-hand and left-hand portions. Message C is generally contained in the register 61 which has been used all throughout the calculation. The same calculation cell (function 62 and combiner 63) can be used for each round.

The deciphering operation (FIG. 4B) comprises submitting a ciphered text C to the n rounds $R_i$, but using the sub-keys in a reverse order (starting with key $K_n$ to end with key $K_0$), to obtain plain text P.

In the case of the DES algorithm, the first round is preceded by a bit-mixing operation (permutation) and the last round is followed by the inverse operation.

To check the integrity of key K stored in register 5, a simple solution would be to be able to reread this key for verification purposes. However, as already indicated, register 5 is not accessible from the outside other than in write mode. Accordingly, the integrity verification must use an indirect mechanism.

K key is thus used twice in a row or in parallel to perform two ciphering operations having their results compared to each other, or a ciphering operation followed by a deciphering operation, and the identity between the original and final messages is then verified.

Figure 5:
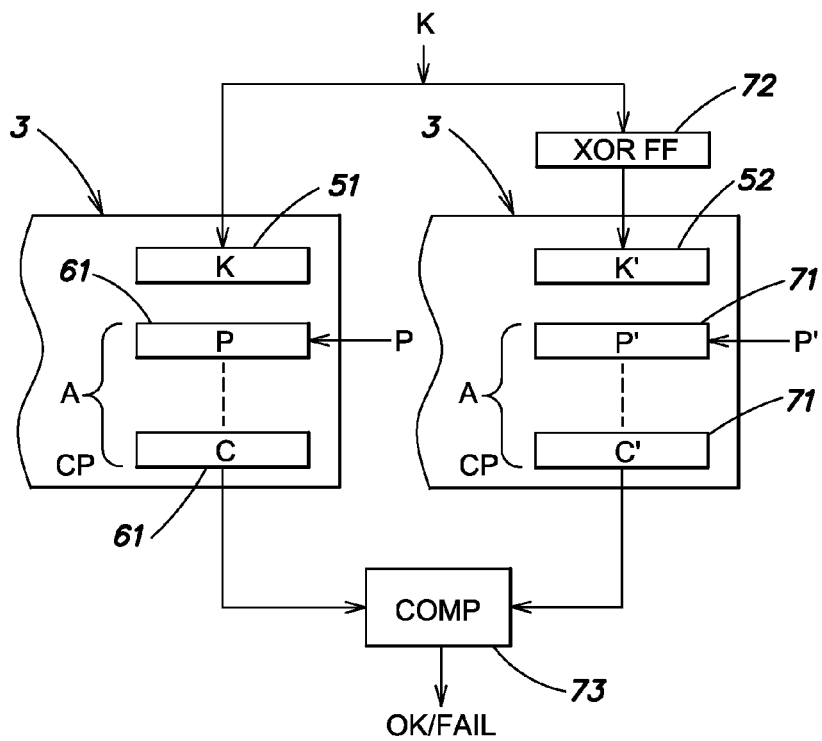
FIG. 5 is a block diagram illustrating an embodiment of the verification mechanism.

FIG. 5 is a block-diagram of an embodiment of a mechanism for verifying the integrity of a key K. In this example, key K is on the one hand, loaded into a key register 51 as it is when it comes from the outside and, on the other hand, submitted to a bit-to-bit complement-to-one operation (block 72, XOR FF) so as to be loaded, in its complemented form K', into a second key register 52 of the same type as the first one. The complement-to-one operation may be performed by the central processing unit causing the loading into registers 51 and 52 or, should its set of instructions allow it, by cryptoprocessor 3. Registers 51 and 52 are accessible in write mode from the outside only, and their reading can only occur within circuit 3. Keys K and K' are used to cipher (algorithm A) a data message P with key K and the complement to one P' of this message with key K'. In the example of FIG. 5, it is assumed that the application of algorithm A to message P is performed in a register 61 and that its application to message P' is performed in a register 71. As a variation, a same register 61 is used and the first obtained result is stored in another storage element during the calculation of the other ciphering. The coherence between ciphered texts C and C' obtained at the end of the application of the algorithm is compared (block 73, COMP), that is, one of the results is complemented to one, and then compared to the other one to verify their identity. A lack of integrity of the key (OKIFAIL), that is a modification of at least one bit of the key between the two executions, is thus detected. The comparison is, preferably, performed by the cryptoprocessor. A lack of integrity is used to prevent the ciphered result from exiting the cryptoprocessor, or to undertake any other appropriate action in case the key is suspected to have been incidentally or intentionally modified.

This implementation takes advantage of the previously-indicated property (for any message P and any key K, the complement to one C' of result C of ciphering algorithm A is equal to the result of the application of this algorithm to complemented message P' with complemented key K'). Thus, the result ($f(X, K_i)$) of the application of the non-linear function f to a data value X with a sub-key $K_i$ is equal to the result ($f(X', K_i')$) of its application to the complements to one X' of the data value and $K_i'$ of the sub-key. Among Feistel algorithms, those having such a function will be selected. Such is especially the case for the DES, LOKI, and GHOST algorithms, but not for those known as RC5, Twofish, Blowfish, or Camelia.

An advantage of using the complement to one is that an inversion of one bit in key K or in its complement to one K' will not provide the same result. Accordingly, an incidental or intentional modification of a bit of the key in one of key registers 51 or 52 may be detected by the verification mechanism. Further, a modification of a same bit in both registers 51 and 52 will also alter the result. The only case where a modification is not detected is the case where all the modified bits of one of registers 51 or 52 are also inverted in the other register 52 or 51 and where the corresponding bits of the right-hand portion are also inverted during their interaction with the sub-key bits used by function f. The incidental occurrence of such a case is however improbable and is difficult to cause intentionally.

Figure 6:
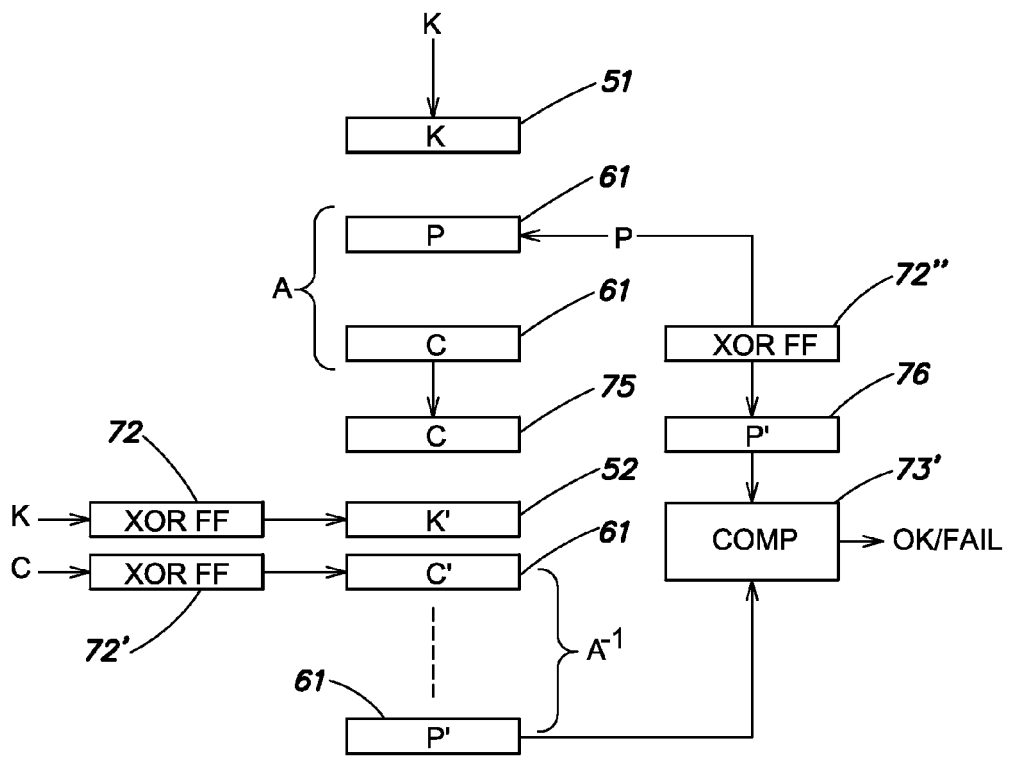
FIG. 6 is a block diagram illustrating another embodiment of the verification mechanism.

FIG. 6 illustrates a variation in which, rather than verifying the identity between results C and C', result C of the ciphering is transferred to a register 75 and value C of register 61 is complemented to one (block 72'). The complement to one C' is then deciphered (algorithm $A^{-1}$) by using key K' (key K complemented to one—block 72) transferred into key register 52. The obtained result needs to correspond to the complement to one P' of the original message. For example, original message P is initially complemented (block 72") and the result is stored in a register 76 of circuit 3 dedicated to the integrity verification. The content of register 76 is compared (block 73') with the result contained at the end of register 61 of the DES.

The steps listed hereafter illustrate an example of successive operations, using a same calculation cell of the DES of circuit 3 (this example corresponds to a variation of FIG. 5 where a same register 61 is used for both calculations):

1. Loading of register 51 with key K;
2. Loading of plain text P into register 61;
3. Selection of register 51 as the key register of the DES;
4. Execution of the DES;
5. Transfer of the content, noted C1, of register 61 to a temporary storage element (for example, a first register dedicated to the integrity verification or an output register);
6. Calculation of complement P' based on message P;
7. Loading of P' into register 61;
8. Calculation of complement K' based on key K of register 51;
9. Loading of register 52 with key K';
10. Selection of register 52 as a key register of the DES;
11. Execution of the DES;
12. Transfer of the content, noted C2, of register 61 to a temporary storage element (for example, a second register dedicated to the integrity verification);
13. Calculation of complement C1' of content C1 of the first register; and
14. Verifying that C1'=C2.

The result which may be obtained from the cryptoprocessor (placed in an internal storage element, accessible in read mode by central unit 2 or another circuit using processor 3) is in any of the first and second registers and has been verified.

The steps listed hereafter illustrate an example of successive operations, using a same calculation cell of the DES of circuit 3, but to perform, as in FIG. 6, a ciphering followed by a deciphering ($DES^{-1}$):

1. Loading of register 51 with key K;
2. Loading of plain text P into register 61;
3. Selection of register 51 as a key register of the DES;
4. Execution of the DES;
5. Transfer of the content, noted C1, of register 61 to a temporary storage element (for example, a first register 75 dedicated to the integrity verification or an output register);
6. Calculation of complement C1' based on result C1;
7. Loading of C1' into register 61;
8. Calculation of complement K' based on K of register 51;
9. Loading of register 52 (or, as a variation, of register 51) with key K';
10. Selection of register 52 (or of register 51 in the variation) as a key register of the $DES^{-1}$;
11. Execution of the $DES^{-1}$;
12. Transfer of the content, noted P2, of register 61 to a temporary storage element (for example, a second register dedicated to the integrity verification);
13. Calculation of complement P2' of the content of this second register; and
14. Verifying that P2'=P.

The result is in register 61 and has been verified.

The steps listed hereafter illustrate an example of successive operations, using a same calculation cell of the DES of circuit 3 to perform a ciphering, followed by a deciphering ($DES^{-1}$), assuming that the cryptoprocessor integrates the complement-to-one calculation function:

1. Loading of register 51 with key K;
2. Loading of plain text P into register 61;
3. Selection of register 51 as a key register of the DES;
4. Execution of the DES;
5. Transfer of the content of register 61 to a temporary storage element (for example, a first register dedicated to the integrity verification or an output register);
6. Calculation of the complement of the content of register 61;
7. Loading of register 52 with key K;
8. Calculation of complement K' of the content of register 52;
9. Selection of register 52 as a key register of the $DES^{-1}$;
10. Execution of the $DES^{-1}$;
11. Calculation of the complement of the content of register 61;
12. Transfer of the content of register 61 to a temporary storage element (for example, a second register dedicated to the integrity verification);

13. Verifying that this register contains original message P. The result is in the first register and has been verified.

It is now possible to verify the integrity of a key used in a ciphering algorithm of Feistel algorithm type.

This verification is compatible with the usual structures of cryptoprocessors and requires no modification thereof (except, for certain variations, for the complement-to-one function if it is desired to be internal to circuit 3). In particular, it is always possible to choose between a parallel or series verification and to share the calculation cell.

The efficiency of such a verification mechanism can be acknowledged by modifying, after the loading of the key into the cryptoprocessor or on each loading of this key, one of the bits of the key register. If this mechanism has been implemented, the error will be detected. If a usual verification mechanism is implemented, the error will not be detected.

An additional advantage of the performed verification is that it not only verifies the integrity of the key but that, additionally, it verifies the very execution of the ciphering algorithm. Indeed, if an error occurs during the execution of the algorithm, the results will not match.

Different embodiments have been described. Different variations are within the abilities of those skilled in the art. In particular, the selection between a parallel or series execution (successive executions) in practice depends on a compromise between the processing speed and the cryptoprocessor bulk. Further, the practical implementation is within the abilities of those skilled in the art based on the functional indications given hereabove, be it for a software or hardware implementation. Further, although the present invention has been described in relation with Feistel algorithms, it more generally applies to symmetrical algorithms for which the result of the ciphering of a message by a key is equal to the complement to one of the result of the ciphering of the complement to one of the message by the complement to one of the key.

Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

What is claimed is:

1. A method for verifying an integrity of a key used by an integrated circuit in a symmetrical ciphering or deciphering algorithm, comprising:
   ones complementing, by the integrated circuit, the key to form a ones complemented key and ones complementing a data value to form a ones complemented data value;
   performing two executions of a same algorithm of the symmetrical ciphering or deciphering algorithm, a first execution with the key and the data value to provide a first result and a second execution with the ones complemented key and the ones complemented data value to provide a second result; and
   verifying, by the integrated circuit, a coherence between the first and second results.

2. The method of claim 1, wherein verifying the coherence between the first and second results comprises comparing the first result with the ones complemented second result or comparing the second result with the ones complemented first result.

3. The method of claim 1, wherein the verification compares two successive executions.

4. The method of claim 1, wherein the verification compares two parallel executions.

5. The method of claim 1, wherein the algorithm used is the DES or one of its variations.

6. An electronic circuit configured to implement the verification method of claim 1.

7. A method for verifying an integrity of a key used by an integrated circuit in a symmetrical ciphering or deciphering algorithm, comprising:
   ones complementing, by the integrated circuit, the key to form a ones complemented key;
   ones complementing, by the integrated circuit, a data value to form a ones complemented data value;
   executing, by the integrated circuit, an algorithm of the symmetrical ciphering or deciphering algorithm with the key and the data value to form a first result;
   executing, by the integrated circuit, said algorithm with the ones complemented key and the ones complemented data value to form a second result; and
   verifying, by the integrated circuit, a coherence between the first result and the second result.

8. A method as defined in claim 7, wherein verifying the coherence between the first result and the second result comprises comparing the first result with the ones complemented second result.

9. A method as defined in claim 7, wherein verifying the coherence between the first result and the second result comprises comparing the second result with the ones complemented first result.

10. A method as defined in claim 7, wherein the executing steps are performed in succession.

11. A method as defined in claim 7, wherein the executing steps are performed in parallel.

12. A method for verifying an integrity of a key used by an integrated circuit in a symmetrical ciphering or deciphering algorithm, comprising:
   executing, by the integrated circuit, the ciphering algorithm with the key and a data value to form a first result;
   ones complementing, by the integrated circuit, the key to form a ones complemented key;
   ones complementing, by the integrated circuit, the data value to form a ones complemented data value;
   ones complementing, by the integrated circuit, the first result to form a ones complemented first result;
   executing, by the integrated circuit, a deciphering algorithm corresponding to the ciphering algorithm with the ones complemented key and the ones complemented first result to form a second result; and
   verifying, by the integrated circuit, a coherence between the ones complemented data value and the second result.

13. An electronic circuit configured to verify an integrity of a key used in a symmetrical ciphering or deciphering algorithm comprising:
   a processing unit and a memory encoded with computer-readable instructions that, when executed by the processing unit, are configured to:
   ones complement the key to form a ones complemented key;
   ones complement a data value to form a ones complemented data value;
   execute an algorithm of the symmetrical ciphering or deciphering algorithm with the key and the data value to form a first result;
   execute said algorithm with the ones complemented key and the ones complemented data value to form a second result; and
   verify a coherence between the first result and the second result.

14. An electronic circuit as defined in claim 13, wherein the computer-readable instructions are configured to verify the coherence between the first result and the second result by comparing the first result with the ones complemented second result.

15. An electronic circuit as defined in claim 13, wherein the computer-readable instructions are configured to verify the coherence between the first result and the second result by comparing the second result with the ones complemented first result.

* * * * *

UNITED STATES PATENT AND TRADEMARK OFFICE
CERTIFICATE OF CORRECTION

PATENT NO. : 8,848,917 B2  
APPLICATION NO. : 12/466284  
DATED : September 30, 2014  
INVENTOR(S) : Pierre-Yvan Liardet et al.

Page 1 of 1

It is certified that error appears in the above-identified patent and that said Letters Patent is hereby corrected as shown below:

In the Specification,

In Column 2, Line 3, "w" should be deleted;

In Column 2, Line 4, "ith" should read --with--; and

In Column 5, Line 10, "OKIFAIL" should read --OK/FAIL--.

Signed and Sealed this  
Thirtieth Day of December, 2014

Michelle K. Lee  
*Deputy Director of the United States Patent and Trademark Office*